United States Patent
Barkey et al.

(10) Patent No.: US 10,800,470 B2
(45) Date of Patent: Oct. 13, 2020

(54) MODULAR FRAME ASSEMBLY FOR A VEHICLE AND VEHICLE HAVING SAME

(71) Applicant: Honda Motor Co., Ltd., Tokyo (JP)

(72) Inventors: Travis Barkey, Dublin, OH (US); Robert T. Wilson, III, Delaware, OH (US); Dustin L. Hinders, Lakeview, OH (US); Dakota D. Kirtland, Dublin, OH (US); AshaLatha Papa, San Pedro, CA (US)

(73) Assignee: Honda Motor Co., Ltd., Tokyo (JP)

( * ) Notice: Subject to any disclaimer, the term of this patent is extended or adjusted under 35 U.S.C. 154(b) by 161 days.

(21) Appl. No.: 16/034,864

(22) Filed: Jul. 13, 2018

(65) Prior Publication Data
US 2020/0017153 A1 Jan. 16, 2020

(51) Int. Cl.
| | |
|---|---|
| *B62D 63/02* | (2006.01) |
| *B62D 21/12* | (2006.01) |
| *B62D 21/18* | (2006.01) |
| *B62D 23/00* | (2006.01) |
| *B60R 21/13* | (2006.01) |
| *B62D 21/14* | (2006.01) |
| *B60G 15/06* | (2006.01) |

(52) U.S. Cl.
CPC .......... *B62D 63/025* (2013.01); *B62D 21/12* (2013.01); *B62D 21/183* (2013.01); *B62D 23/005* (2013.01); *B60G 15/067* (2013.01); *B60R 21/13* (2013.01); *B62D 21/14* (2013.01)

(58) Field of Classification Search
CPC .... B62D 63/025; B62D 21/12; B62D 21/183; B62D 23/005; B62D 21/14; B60R 21/13; B60G 15/067
USPC .................................. 296/29, 205; 293/133
See application file for complete search history.

(56) References Cited

U.S. PATENT DOCUMENTS

| | | | |
|---|---|---|---|
| 4,533,172 A | 8/1985 | Oliver | |
| 5,071,188 A | 12/1991 | Thum | |
| 5,495,905 A * | 3/1996 | Fini, Jr. .................. | B60K 17/00 180/21 |
| 5,882,064 A | 3/1999 | Emmons | |
| 6,450,567 B2 | 9/2002 | Toba et al. | |
| 6,698,968 B2 * | 3/2004 | Kajiwara ................ | B60R 19/34 403/337 |
| 7,140,670 B2 | 11/2006 | Olson | |

(Continued)

*Primary Examiner* — Darlene P Condra
(74) *Attorney, Agent, or Firm* — American Honda Motor Co., Inc.; Gregory J. Burke

(57) ABSTRACT

A frame assembly for a vehicle can include a fixed frame assembly, a removable frame assembly and a bracket. The fixed frame assembly can include a rear frame member extending along a longitudinal direction of the vehicle. The removable frame assembly can be selectively removed and attached to the fixed frame assembly. The removable frame assembly can include a tubular frame member extending along the rear end of the fixed frame assembly, and can be configured to deform in a predictable and predetermined controlled manner if a load or kinetic energy input to the tubular frame member is greater than a first predetermined threshold. The bracket can be connected to the tubular member and the rear frame member, and the bracket can be configured to deform in a predictable and predetermined controlled manner if a load or kinetic energy input to the bracket is greater than a second predetermined threshold.

18 Claims, 10 Drawing Sheets

(56) References Cited

U.S. PATENT DOCUMENTS

| | | |
|---|---|---|
| 7,293,808 B2 | 11/2007 | Leske |
| 7,438,319 B2 | 10/2008 | Cooper et al. |
| RE42,086 E | 2/2011 | Saito et al. |
| 7,992,926 B2 | 8/2011 | Tamakoshi |
| 8,056,926 B2 | 11/2011 | Okabe et al. |
| 8,328,235 B2 | 12/2012 | Schneider et al. |
| 8,517,423 B1 | 8/2013 | Huston et al. |
| 8,973,693 B2 | 3/2015 | Kinsman et al. |
| 9,365,241 B1 | 6/2016 | Taracko et al. |
| 9,393,894 B2 | 7/2016 | Steinmetz et al. |
| 9,751,480 B1* | 9/2017 | Graves .................. B60R 19/34 |
| 2005/0179268 A1* | 8/2005 | Kollaritsch ............ B60R 19/34 |
| | | 293/133 |
| 2006/0180383 A1* | 8/2006 | Bataille ................ B62D 21/183 |
| | | 180/311 |
| 2007/0138840 A1* | 6/2007 | Caliskan ................ B62D 25/08 |
| | | 296/205 |
| 2007/0176443 A1* | 8/2007 | Yasuhara ............. B62D 21/152 |
| | | 293/133 |
| 2008/0185852 A1* | 8/2008 | Suzuki .................. B60R 19/36 |
| | | 293/132 |
| 2011/0121597 A1* | 5/2011 | Asou .................... B62D 21/152 |
| | | 296/37.2 |
| 2014/0021729 A1* | 1/2014 | Kosaka .................. B60R 19/26 |
| | | 293/133 |
| 2014/0125073 A1* | 5/2014 | Yamada ................. B21D 53/88 |
| | | 293/133 |
| 2014/0361562 A1* | 12/2014 | Borger .............. B29C 45/14467 |
| | | 293/133 |
| 2015/0061307 A1* | 3/2015 | Nakanishi ............... B60R 19/34 |
| | | 293/133 |
| 2015/0102615 A1* | 4/2015 | Alavandi ............... B60R 19/34 |
| | | 293/133 |
| 2015/0298634 A1* | 10/2015 | Hara ...................... B60R 19/34 |
| | | 293/133 |
| 2016/0121829 A1* | 5/2016 | Murata .................. B60R 19/34 |
| | | 293/133 |
| 2017/0001586 A1 | 1/2017 | Ashraf et al. |
| 2017/0057548 A1* | 3/2017 | Yamada .................. B62D 25/087 |
| 2017/0210316 A1 | 7/2017 | Duffe |
| 2018/0065465 A1* | 3/2018 | Ward ..................... B60G 3/185 |
| 2018/0099631 A1* | 4/2018 | Jayachandran ....... B60R 19/023 |
| 2018/0244227 A1* | 8/2018 | Miller .................... B60R 19/56 |
| 2019/0031260 A1* | 1/2019 | Filion .................... B62D 65/02 |
| 2019/0152414 A1* | 5/2019 | Glickman .............. B60R 19/34 |
| 2019/0270490 A1* | 9/2019 | Holroyd ............... B60K 17/043 |

\* cited by examiner

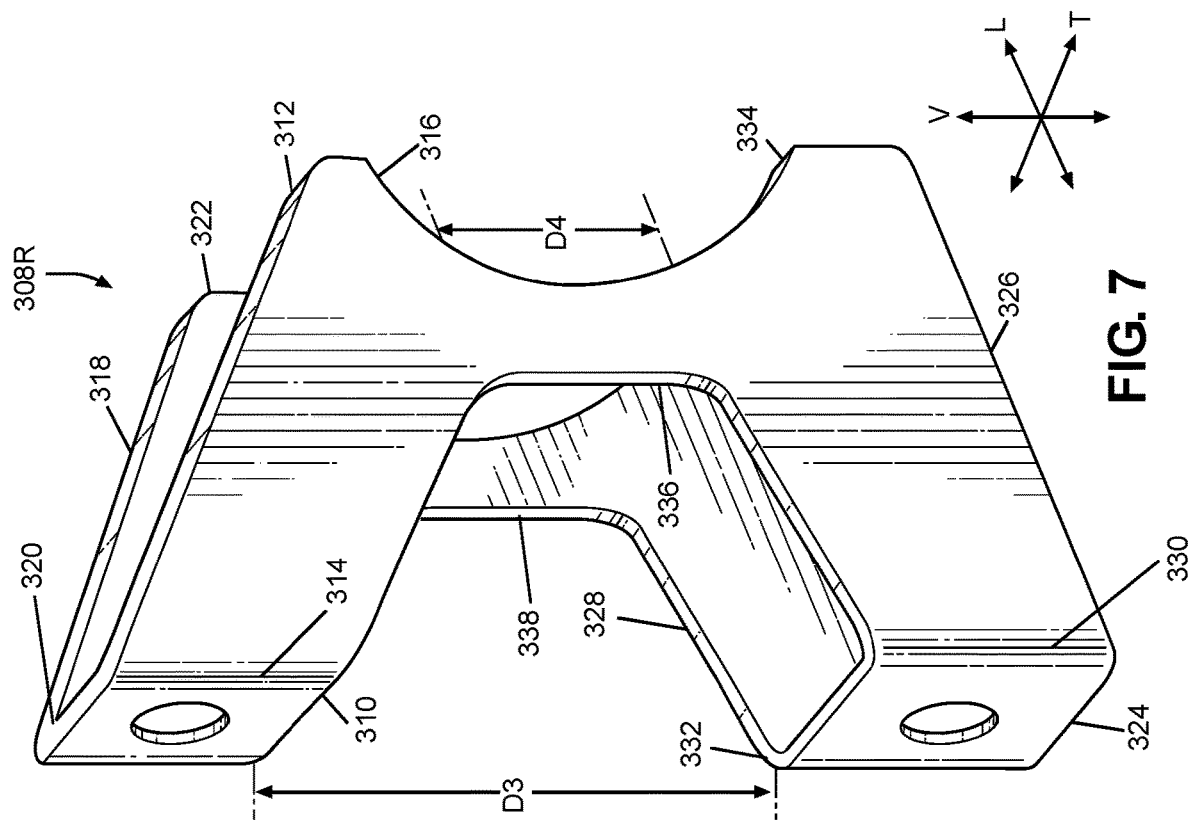
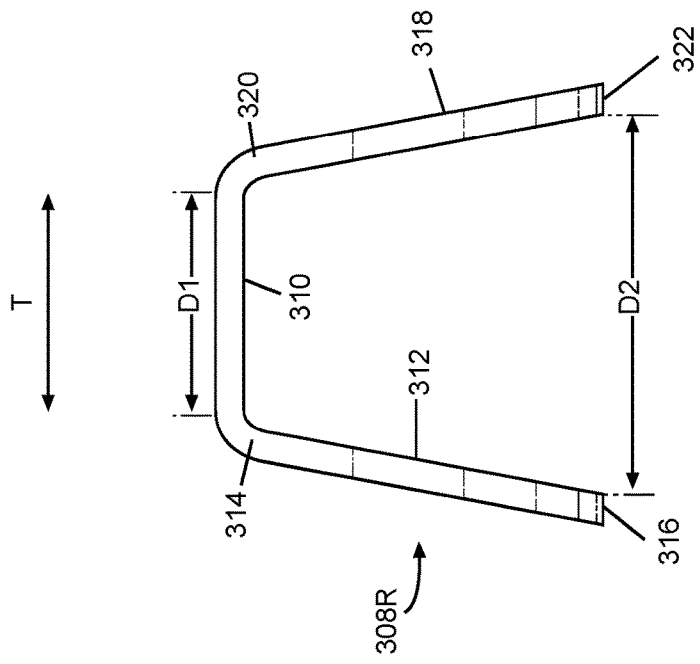

MODULAR FRAME ASSEMBLY FOR A VEHICLE AND VEHICLE HAVING SAME

BACKGROUND

The disclosed subject matter relates to a vehicle and a modular frame assembly for the vehicle. More particularly, the disclosed subject matter relates to methods and apparatus that enhance load and energy management performance upon application of external loads and stresses, such as this that may occur during off-road travel over uneven terrain.

Vehicles, such as but not limited to all-terrain vehicles, can be subjected to relatively large load and/or energy inputs to the frame assembly due to the unevenness of the terrain across which the vehicle is travelling. An all-terrain vehicle can include a generally rigid frame assembly that is designed to withstand the load and energy inputs transmitted from the wheels and through the suspension components during travel over the uneven terrain. For example, space constraints and off-road durability may make it beneficial to provide very stiff portions of the vehicle frame that are spaced from the passenger area, such as but not limited to frame structures around the front suspension components, rear suspension components and/or powertrain components.

SUMMARY

Some embodiments are directed to a frame assembly for a vehicle that can include a fixed frame assembly, a removable frame assembly, and a bracket. The fixed frame assembly can include a rear frame member extending along a longitudinal direction of the vehicle and ending at a rear end of the fixed frame assembly. The removable frame assembly can be configured to be selectively removed and attached to the fixed frame assembly. The removable frame assembly can include a tubular frame member extending along the rear end of the fixed frame assembly. The tubular frame member can be configured to deform in a predetermined controlled manner if a load or kinetic energy input to the tubular frame member is greater than a first predetermined threshold. The bracket can be connected to each of the tubular member and the rear frame member. The bracket can be configured to deform in a predetermined controlled manner if a load or kinetic energy input to the bracket is greater than a second predetermined threshold.

Some embodiments are directed to a modular frame assembly for a vehicle that can include a fixed frame assembly, a removable frame assembly, and a pair of brackets. The fixed frame assembly can include a plurality of frame members fixed in a predetermined spatial relationship to each other. The plurality of frame members can include at least a pair of rear frame members fixed relative to each other and extending along a longitudinal direction of the vehicle. The removable frame assembly can be configured to be selectively removable and attachable to the fixed frame assembly at a plurality of predetermined locations on the fixed frame assembly. The removable frame assembly can include a tubular member configured to deform in a predetermined controlled manner if a load or kinetic energy input to the tubular member is greater than a first predetermined threshold. Each of the brackets can be connected to the tubular member and a respective one of the rear frame members. Each of the brackets can be configured to deform in a predetermined controlled manner if a load or kinetic energy input to the respective one of the brackets is greater than a second predetermined threshold.

Some embodiments are directed an all-terrain vehicle that can include a fixed frame assembly and a removable frame assembly. The fixed frame assembly can include a main frame assembly, a front frame assembly, and a rear frame assembly. The main frame assembly can include a plurality of main frame members connected together to define a first portion of a passenger compartment. Each of a pair of the main frame members includes a main frame joint member. The front frame assembly can be configured to support a front suspension and wheel assembly and connected to a front end of the main frame assembly. The rear frame assembly can be configured to support a rear suspension and wheel assembly and connected to a rear end of the main frame assembly such that the main frame assembly is located between the front frame assembly and the rear frame assembly, and the rear frame assembly can include a pair of rear frame members and a pair of first brackets. The rear frame members can extend away from the main frame assembly along a longitudinal direction of the vehicle and spaced apart in a transverse direction of the vehicle. Each of the first brackets can be connected to and extends from a respective one of the rear frame members. The removable frame assembly can be configured to define a second portion of he passenger compartment. The removable frame assembly can include a pair of first removable frame members, a pair of second removable frame members, a tubular frame member, and a pair of second brackets. The first removable frame members can extend along the longitudinal direction of the vehicle and can be spaced apart from each other in the transverse direction of the vehicle Each of the second removable frame members can be connected to a respective one of the first removable frame members. Each of the second removable frame members can include a removable frame joint member selectively and can be removably connected to a respective one of the main frame joint members. The tubular frame member can be connected to and can extend from each of the first removable frame members along the transverse direction of the vehicle. The tubular frame member can be configured to deform in a predetermined controlled manner if a load or kinetic energy input to the tubular frame member is greater than a first predetermined threshold. The second brackets can be connected to and can extend away from the tubular member along the longitudinal direction of the vehicle. Each of the second brackets can be selectively and removably connected to a respective one of the first brackets. Each of the second brackets can be configured to deform in a predetermined controlled manner if a load or kinetic energy input to a respective one of the brackets is greater than a second predetermined threshold.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 7 is a perspective view of a first bracket in accordance with the disclosed subject matter.

FIG. 8 is a top view of the first bracket of FIG. 7.

DETAILED DESCRIPTION OF EXEMPLARY EMBODIMENTS

Figure 1:
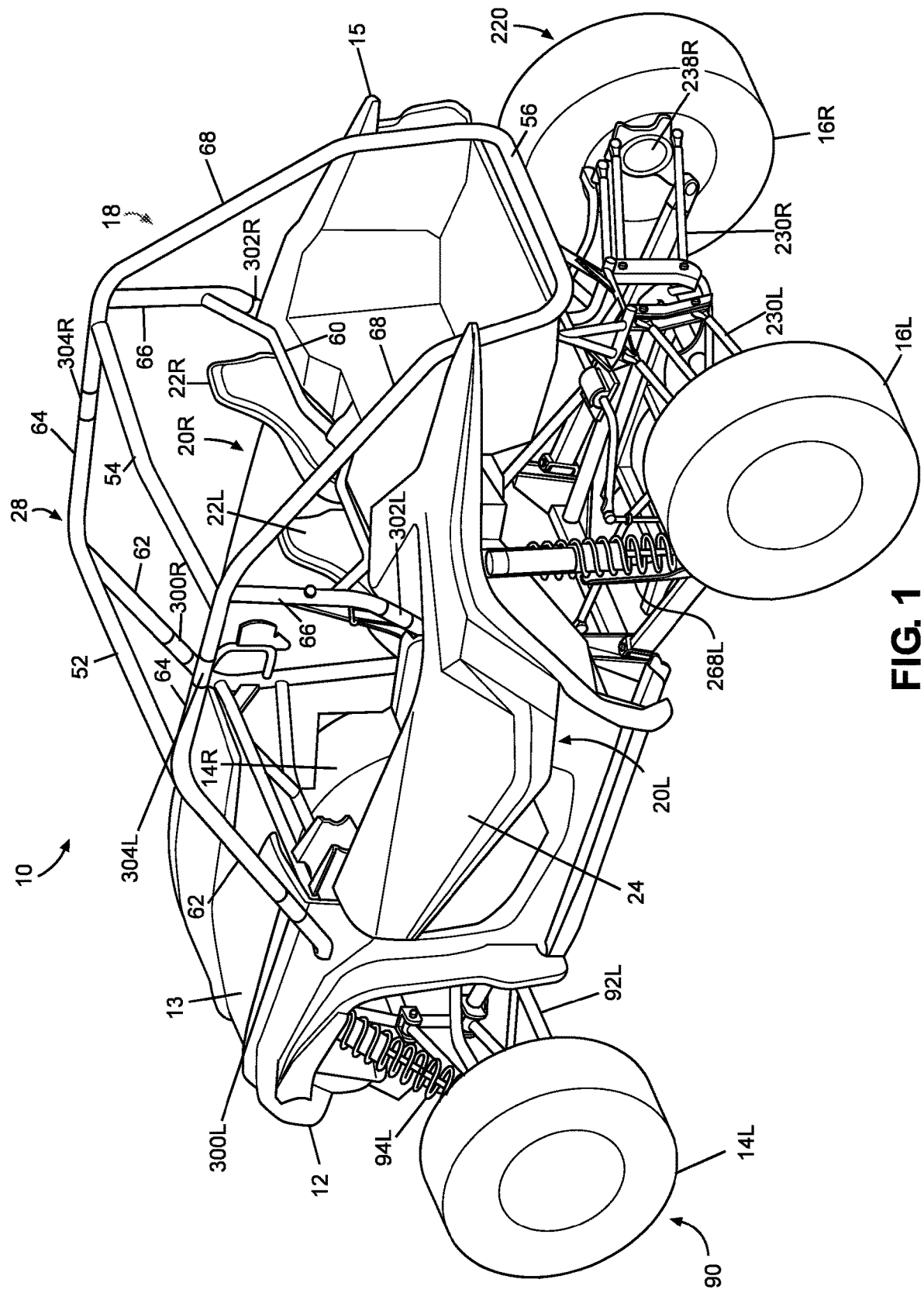
FIG. 1 is a perspective view of a vehicle made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Various vehicular design factors may make it challenging to sufficiently impede or prevent deformation of a vehicle frame defining the passenger area upon application of significant force inputs into the frame assembly. The stiff portions of the vehicle frame that are spaced from the passenger area, such as but not limited to frame structures around the front suspension components, rear suspension components and/or powertrain components, can transmit most of or the entire load or kinetic energy input to the portion of the vehicle frame defining the passenger area. Typical vehicle frame design constraints and requirements may also limit the use of structures for managing the input load or kinetic energy. As a result, the portion of the vehicle frame defining the passenger area can be subject to deformation due to the input load or kinetic energy.

It may therefore be beneficial to provide a vehicle and a frame for the vehicle with an apparatus that addresses at least one of the above and/or other challenges of related art vehicles. In particular, it may be beneficial to enhance input load and energy management performance upon application of an external load, such as by controlling deformation of the vehicle frame and/or mitigating energy transmission to the passenger area caused by the input load or kinetic energy. For example, portions of the vehicle frame assembly can be configured to absorb and transfer, in a predetermined controlled manner, the load or kinetic energy that originated from the input load or kinetic energy.

In some of these and/or other embodiments, the vehicle frame can be configured to deform at portions spaced from the passenger area. In addition, the frame can be configured with structures that can resist deformation during routine off-road usage of the vehicle, but that can deform in a predetermined controlled manner in response to an input load or kinetic energy. In some of the disclosed and/or other embodiments, the vehicle frame can be configured to deform in the vicinity of the passenger area in a predetermined controlled manner so that the dimensions of the passenger area after loading can be substantially the same as the dimensions of the passenger area prior to the input load or kinetic energy.

In some of these and/or other embodiments, the vehicle frame can include a rigid frame assembly that can surround the passenger area, support the powertrain, and support the suspension and wheel assemblies. For an all-terrain vehicle, it may be beneficial to provide the rigid frame assembly that is more durable that a frame assembly for a vehicle intended for use on an improved path. However, repair and/or replacement of one or more portions of the rigid frame assembly can be labor intensive and costly. For example, it may be less advantageous for the performance of the rigid frame assembly to replace a damaged section of the rigid frame assembly as compared to replacing the entire rigid frame section or at least a significant portion of the rigid frame assembly that includes the damaged frame member.

It may therefore be beneficial to provide a vehicle with a frame assembly that addresses at least one of the above and/or other disadvantages or concerns of the related art. In particular, it may be beneficial to utilize a frame assembly that is sufficiently rigid to cope with load and/or energy inputs from the suspension as the vehicle travels over uneven terrain of an unimproved path, and that is sufficiently deformable in a predetermined controlled manner in response to load and/or energy inputs different from those input by the suspension. For example, it may be beneficial to utilize a frame assembly that includes at least one deformable frame member that can be connected to a rigid rear frame assembly such that the deformable frame member absorbs the load of kinetic energy without transferring the load or input energy to the frame, or at least absorbing a portion of the load or input energy. Further, it may be beneficial to provide a frame assembly that includes modular components so that the cost of repair and/or replacement of a damaged portion of the frame assembly can be reduced. Further still, it may be beneficial to connect at least one modular portion of the frame assembly to a rigid portion of the frame assembly with one or more connector structures that can deform in a predetermined and predictable manner.

Figure 2:
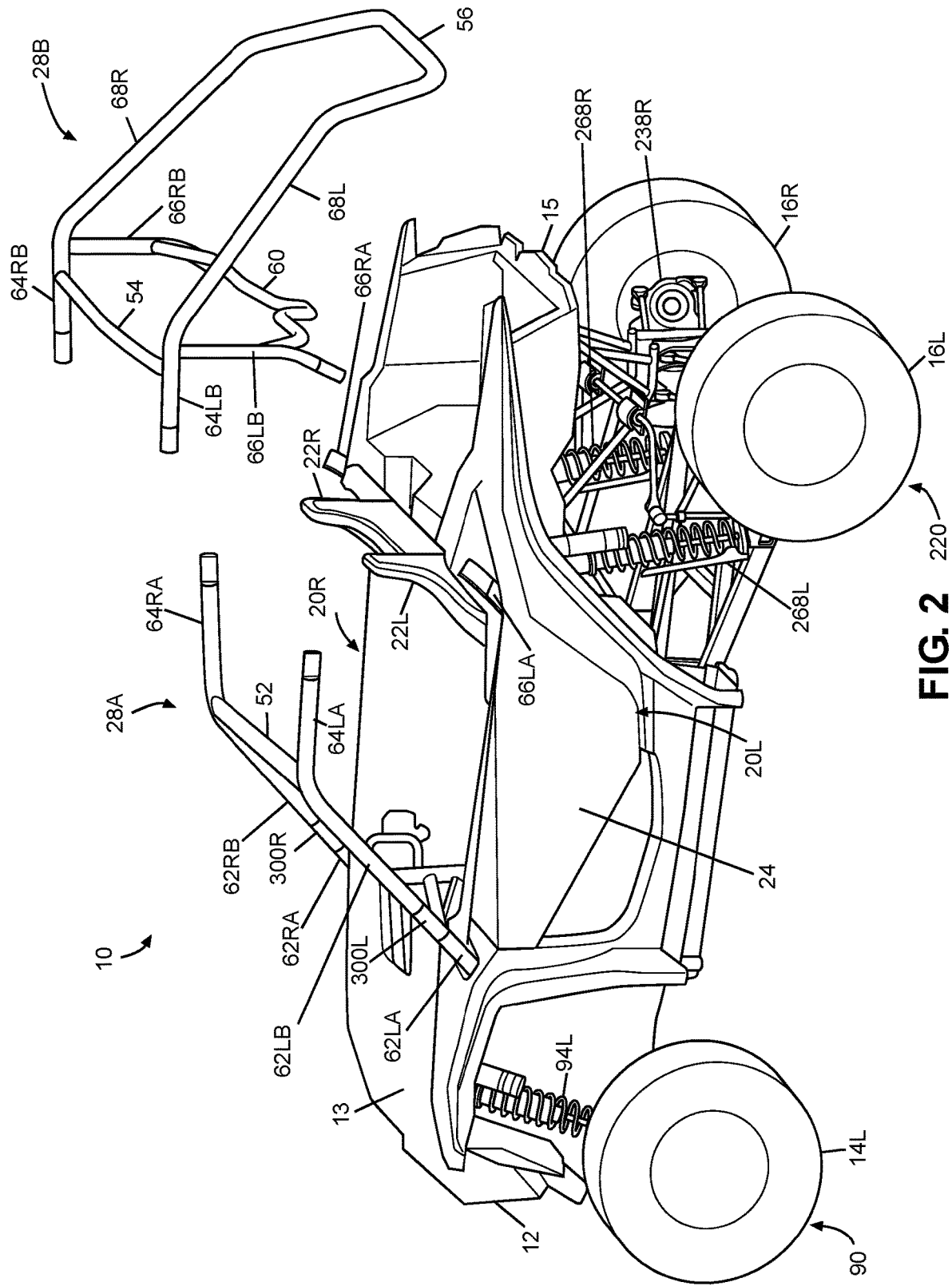
FIG. 2 is a perspective view of the vehicle of FIG. 1 with a portion of the roll cage detached from the vehicle.

FIGS. 1 and 2 are perspective views of an exemplary vehicle 10 including frame assembly 18 in accordance with the disclosed subject matter. The vehicle 10 shown in FIGS. 1 and 2 is specialized for use on an unimproved path or on an unmarked path, and can be referred to as a multipurpose utility vehicle (MUV) or as a side-by-side all-terrain vehicle (SxS, or SxS ATV).

However, the disclosed vehicle frame assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 3:
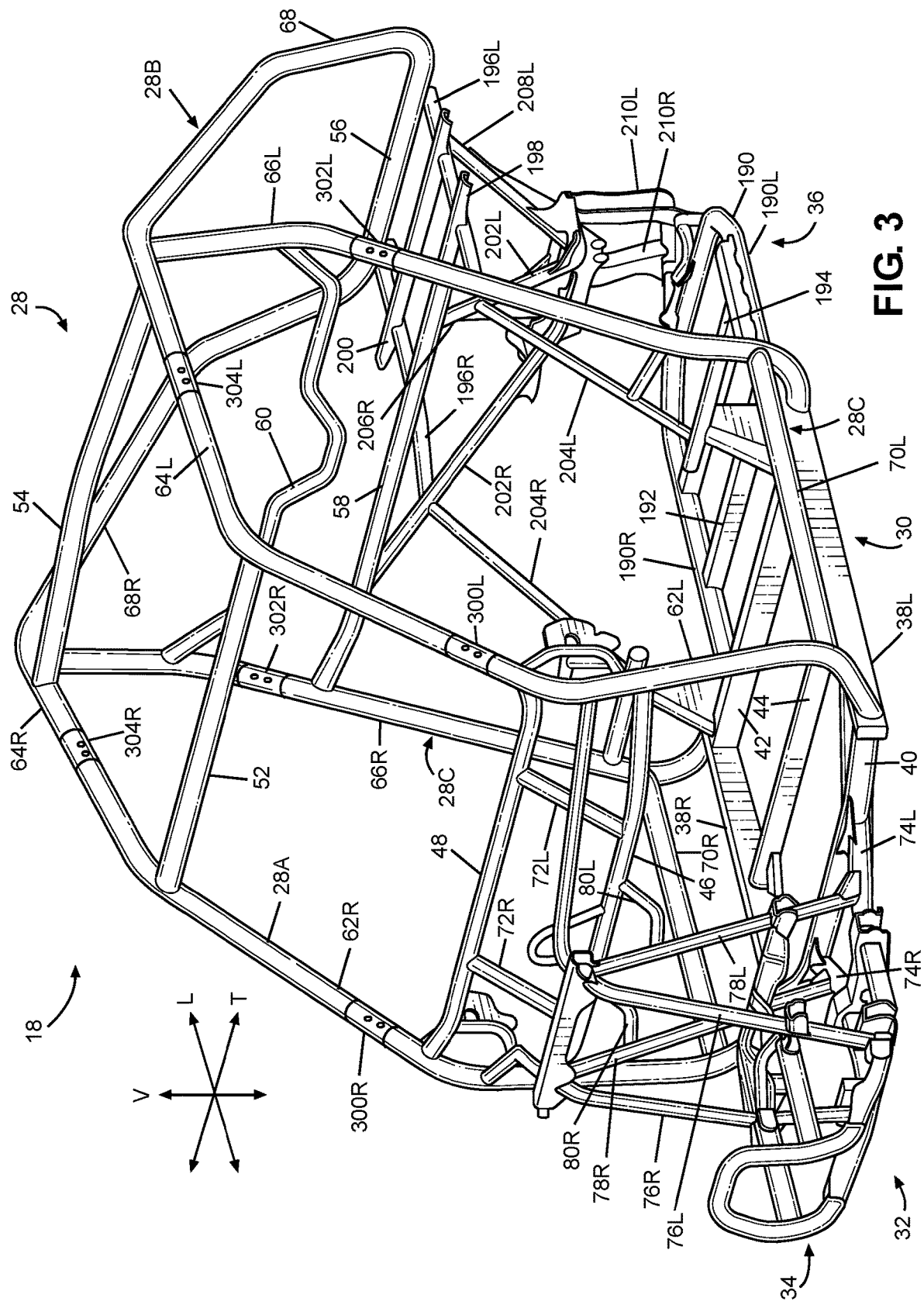
FIG. 3 is perspective upper front view of a frame assembly of the vehicle of FIG. 1.
Figure 4:
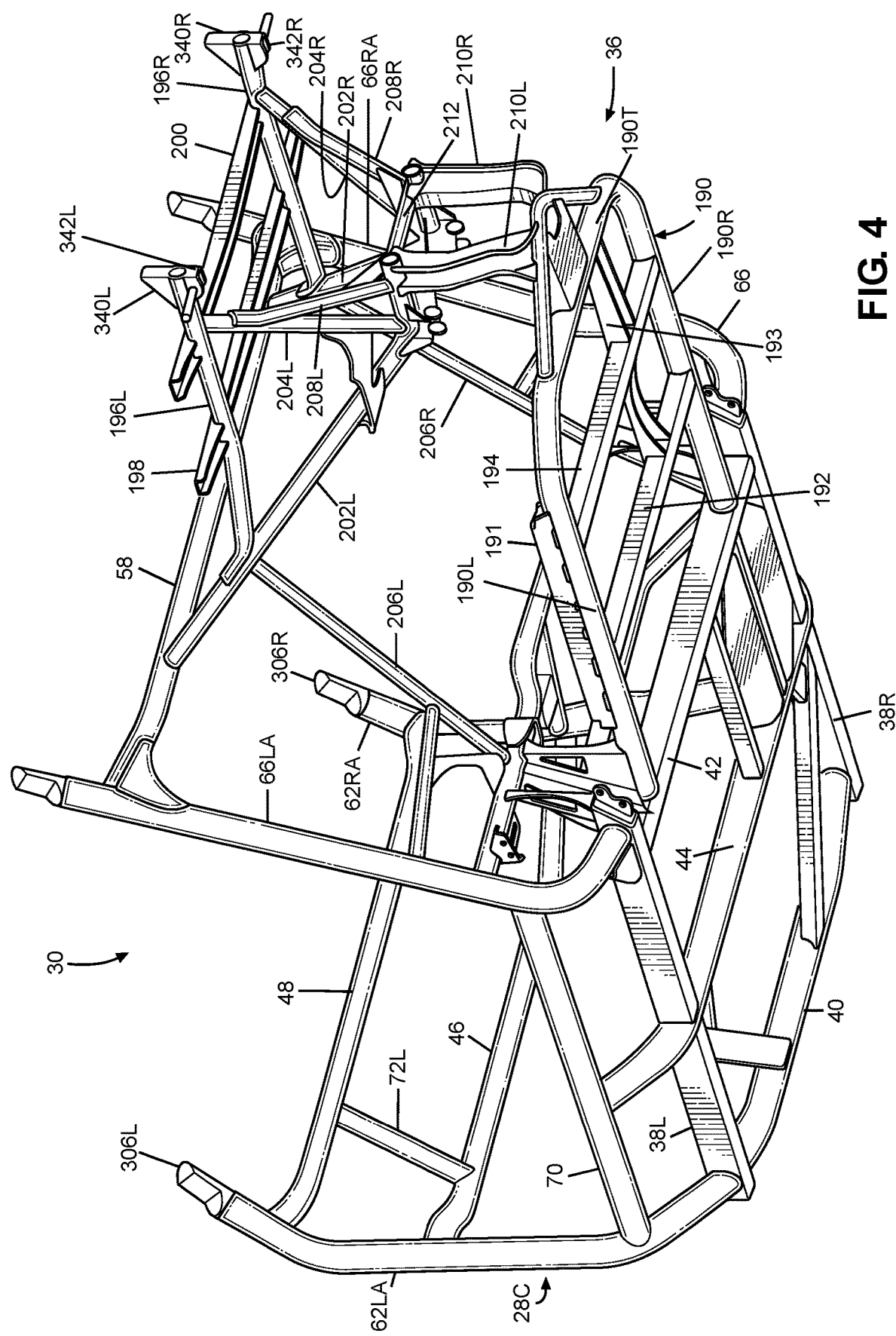
FIG. 4 is perspective lower rear view of a portion of the frame assembly of FIG. 3.

The vehicle 10 can include a body 12, a pair of front wheels, 14L, 14R, a pair of rear wheels 16L, 16R, a frame assembly 18, a pair of door assemblies 20L, 20R, and a powertrain. Portions of the frame assembly 18 are hidden from view in FIG. 1 by the body 12 (but are shown in FIGS. 3 and 4), and the powertrain is omitted from FIGS. 1-6 and 9 for simplicity and clarity of the drawings.

The vehicle 10 can include a pair of front seats 22L, 22R mounted in a passenger area of the vehicle 10. The frame assembly 18 can include a roll cage 28 configured to extend around and above the seats 22L, 22R and the passenger area. The roll cage 28 can cooperate with the body 12 and/or at least a portion of the frame assembly 18 to define a pair of door openings through which a passenger may pass in order to enter or exit the passenger area. Referring to FIG. 2, the roll cage 28 can have a modular construction that includes a first cage portion 28A and a second cage portion 28B. As will be discussed in further detail below, the modular construction of the roll cage 28 can facilitate repair and/or replacement of the roll cage 28.

Referring to FIGS. 1 and 2, the door assemblies 20L, 20R, which occupy the door openings, each can include a door 24 and a window panel assembly, and can be configured to selectively open and close access through the door openings by moving between a closed position and a fully opened position. The window panel assemblies are omitted from FIGS. 1 and 2 for clarity and simplicity of the drawings. In the closed position, the door assemblies 20L, 20R, can span the respective door openings to obstruct access to the passenger area via the door openings. In the closed position, the front portion of each door assembly 20L, 20R can be latched to the roll cage 28. The fully opened position can be any position where the door assemblies 20L, 20R are pivoted away from the respective door openings to provide substantially unobstructed access to the passenger area via the door openings. FIGS. 1 and 2 show the door assemblies 20L, 20R in the closed position.

The powertrain can include an internal combustion engine, one or more electric motor(s) or a hybrid of an internal combustion engine and one or more electric motor(s), a hydrogen engine, or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14 and selectively drive the rear wheels 16L, 16R. In the exemplary embodiment of FIG. 1, the powertrain is configured as a longitudinally oriented, rear-mounted internal combustion engine that drives the rear wheels 16L, 16R and selectively drives the front wheels 14L, 14R.

II. Frame Assembly

FIG. 3 is a perspective view of the frame assembly 18 of the vehicle 10 shown in FIGS. 1 and 2, with the body 12 and all other components, assembly(ies) and system(s) removed. FIG. 4 is a perspective view of the frame assembly 18 of FIG. 2 with the upper portion of the roll cage 28 and the front frame assembly 32 removed for simplicity and clarity of the drawing. The frame assembly 18 can be configured to support the body 12, door assemblies 20L, 20R, seats 22L, 22R, suspension components for the wheels 14L, 14R, 16L, 16R, powertrain, steering system, control pedal assemblies, passengers and cargo items. The frame assembly 18 can be configured to withstand various modes of operation, including operation on unimproved paths, and can be configured to surround the passenger area.

The frame assembly 18 can include a main frame assembly 30, a front frame assembly 32, a front bumper assembly 34 and a rear frame assembly 36.

The main frame assembly 30 can define the passenger area of the vehicle 10. The main frame assembly 30 can also provide an overall bending stiffness and torsional stiffness characteristic for the vehicle 10 that can be advantageous for rugged terrain of an unimproved path.

The front frame assembly 32 can be connected to the front end of the main frame assembly 30. The front frame assembly 32 can be configured with mounting points for the front suspension components and any appropriate components/systems, such as but not limited to portions of the body 12, a front final drive assembly, steering system components, engine cooling system, headlights, etc.

The front bumper assembly 34 can be connected to the front end of the front frame assembly 32, such that the front frame assembly 32 can be located between the front bumper assembly 34 and the main frame assembly 30. The front bumper assembly 34 can extend beyond the exterior of the body 12, or alternatively, one or more portions of the body 12 can conceal the front bumper assembly 34.

The rear frame assembly 36 can be connected to the rear end of the main frame assembly 30 such that the passenger compartment is located between the front frame assembly 32 and the rear frame assembly 36. The rear frame assembly 36 can be configured with mounting points for the rear suspension components and any appropriate components/systems, such as but not limited to portions of the body 12, a rear final drive assembly, taillights, etc.

The main frame assembly 30, front frame assembly 32, front bumper assembly 34 and rear frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

A. Front Frame Assembly

Referring to FIG. 3, the front frame assembly 32 can be connected to the first lower cross member 40 and each of the first cage side members 62 of the main frame assembly 30. The front frame assembly 32 can include the front bumper assembly 34, a pair of front lower members 74L, 74R, a pair of first front members 76L, 76R, a pair of second front members 78L, 78R, a pair of intermediate members 80L, 80R and a transverse frame assembly 82. The frame members 76L, 76R, 78L, 78R, 80L, 80R, 82 can be connected together to form a fixed frame assembly in which selective removal and attachment is not intended. That is, the frame members 76L, 76R, 78L, 78R, 80L, 80R, 82 are intended remain fixed to each other unless a destructive process such as but not limited to sawing, cutting, crushing, ripping, melting, etc., is applied to the fixed frame assembly. In contrast, at least one portion of the frame assembly 18 is intended to be selectively removable and attachable to a remainder of the frame assembly 18 without requiring a destructive process such as but not limited to sawing, cutting, crushing, ripping, melting, etc. Further details of an exemplary removable frame assembly will be discussed below.

The front frame members 76L, 76R, 78L, 78R can be spaced apart from each other in the transverse direction T of the vehicle 10 by a predetermined distance sufficient to accommodate any component(s) and/or system(s) to be supported by the front frame assembly 32. The front frame assembly 32 can be configured to support a front suspension and wheel assembly 90 (FIG. 1), and other components such as but not limited to a radiator, a steering rack assembly and a front final drive assembly. Referring to FIG. 1, the front suspension and wheel assembly 90 can include, at least one front suspension member 92L on each side of the front frame assembly 32, a damper and spring assembly 94L on each side of the front frame assembly 32, a front hub assembly on each side of the front frame assembly 32, and the front wheels 14L, 14R. (The right-side suspension member(s), the right-side damper and spring assembly, the right-side wheel, and both of the front hub assemblies are obstructed from view in FIG. 1).

In the exemplary embodiment of FIG. 3, each of the front lower frame members 74L, 74R, the first front frame members 76L, 76R, the second front frame members 78L, 78R are configured as hollow metal tubes having a substantially circular cross-section. However, any combination of the front lower frame members 74L, 74R, the first front frame members 76L, 76R and the second front frame members 78L, 78R can be have a cross-sectional shape that is different from a substantially circular cross-sectional shape. Further, any combination of the front lower frame members 74L, 74R, the first front frame members 76L, 76R and the second front frame members 78L, 78R can be formed of a material other than metal, such as but not limited to carbon fiber, plastic, carbon fiber reinforced plastic, ceramic, pulp, or glass fiber reinforced plastic.

Further, the front lower frame members 74L, 74R, the first front frame members 76L, 76R, the second front frame members 78L, 78R can be welded to each other to form the structure described above. However, embodiments are intended to include or otherwise cover any combination of the front lower frame members 74L, 74R, the first front frame members 76L, 76R and the second front frame members 78L, 78R connected by threaded fasteners, adhesives, a combination of brackets and threaded fasteners, rivets, or other known connective structures, materials, or methods.

B. Front Bumper Assembly

The front frame assembly 32 can include the front bumper assembly 34. Referring to FIG. 3, the front bumper assembly 34 can be connected to the front side of the first frame members 76L, 76R, such that the first and second frame members 76L, 76R, 78L, 78R are located between or intermediate the front bumper assembly 34 and the main frame assembly 30. The front bumper assembly 34 can be removably connected to the first frame members 76L, 76R in any appropriate manner such as but not limited to threaded fasteners, hinges, latches, rivets, etc.

The front bumper assembly 34 can be configured to deform in a predetermined and controlled manner in response to load or kinetic energy input to the front bumper assembly 34 that exceeds a predetermined threshold.

C. Rear Frame Assembly

1. Fixed Frame Assembly

Referring to FIGS. 3 and 4, the rear frame assembly 36 can include rear lower frame member 190, a first lower cross frame member 192, a second lower cross frame member 194, a pair of bed frame members 196L, 196R, a first bed cross member 198, a second bed cross member 200, a pair of first rear frame members 202L, 202R, a pair of second rear frame members 204L, 204R, a pair of third rear frame members 206L, 206R, a pair of fourth rear frame members 208L, 208R, a pair of rear connecting frame members 210L, 210R, a rear cross frame member 212 and rear extension frame member 214. The first rear frame members 202L, 202R and the second rear frame members can be referred to a first upper frame members and second upper frame members, respectively. The rear frame members 190, 192, 194, 198, 200, 202L, 202R, 204L, 204R, 206L, 206R, 208L, 208R, 210L, 210R can be connected together to form a fixed frame assembly in which selective removal and attachment is not intended. That is, the frame members 190, 192, 194, 198, 200, 202L, 202R, 204L, 204R, 206L, 206R, 208L, 208R, 210L, 210R are intended remain fixed to each other unless a destructive process such as but not limited to sawing, cutting, crushing, ripping, melting, etc., is applied to the fixed frame assembly. In contrast, at least one portion of the frame assembly 18 is intended to be selectively removable and attachable to a remainder of the frame assembly 18 without requiring a destructive process such as but not limited to sawing, cutting, crushing, ripping, melting, etc. Further details of an exemplary removable frame assembly will be discussed below.

The rear frame assembly 36 can be configured to support a rear suspension and wheel assembly 220, and other components such as but not limited to a power source, a transmission and a rear final drive assembly. Referring to FIGS. 1 and 2, the rear suspension and wheel assembly 220 can include, at least one rear suspension member 230L, 230R on each side of the rear frame assembly 36, a rear damper and spring assembly 268L, 268R on each side of the rear frame assembly 36, a rear hub assembly 238R on each side of the rear frame assembly 26, and the rear wheels 16L, 16R. (The right-side damper and spring assembly 268R are obstructed from view in FIG. 1, and the left-side rear hub assembly are obstructed from view in FIGS. 1 and 2).

2. Exemplary Components and Layout

The rear lower frame member 190 can be connected to and can extend away from the main frame assembly 30 in the longitudinal direction L of the vehicle 10. The rear lower frame member 190 can have two side portions 190L, 190R and a cross portion 190T arranged in generally U-shaped configuration such that the cross portion 190T extends between the side portions 190L 190R.

As shown in the exemplary embodiment of FIGS. 3 and 4, the lower frame member 190 can be a single homogenous piece formed by bending a hollow pipe. In accordance with the disclosed subject matter, the lower frame member 190 can be formed from a plurality of sections that are subsequently fastened together in any appropriate manner such as but not limited to welding, adhesives, mechanical fasteners, etc. The individual sections can be formed in the desired shape by any appropriate process such as but not limited to pipe bending, casting, forging, hydroforming, etc.

The first and second lower cross frame members 192, 194 can be connected to and/or form the rear lower frame member 190 at respective locations that are spaced apart in the longitudinal direction L of the vehicle 10. The first and second lower cross frame members 192, 194 can extend in the transverse direction T of the vehicle 10 from each of the side portions 190L, 190R. The first cross frame member 192 can be located between the second lower cross member 42 and the second lower cross frame member 194.

The rear lower frame member 190 and the lower cross frame members 192, 194 can be configured to support a powertrain assembly. For example, an exemplary powertrain can include a power source such as but not limited to an internal combustion engine (having a single cylinder or a plurality of cylinders), an electric motor, or a hybrid system that includes an internal combustion engine and an electric motor. The powertrain also can include a transmission connected to the power source and a final drive structure. The transmission can include various types of transmissions including a stepped speed ratio assembly or a continuously variable speed ratio assembly. The transmission can be configured as an automatic transmission, a manual transmission, or a semi-automatic transmission. The power source 218 and the transmission can be connected to the rear lower frame member 190 in any appropriate manner such as but not limited to brackets and mechanical fasteners, welds, rivets, rubber mounting assembly(ies), fluid filled mounting assembly(ies), or any combination thereof.

Referring to FIG. 4, the power source and the transmission can be mounted on a left rail 191 and a right rail 193. The left rail 191 can be mounted to the left side portion 190L of the rear lower frame member 190. The right rail can be mounted to each of first lower cross member 192, the second lower cross member 194 and the cross portion 190T of the rear lower frame member 190. The right rail 193 can be spaced inward away from the right side portion 190R in the transverse direction T of the vehicle 10. One or more engine mounts can be connected between the power source 218 and each of the rails 191, 193. The transmission can be connected to one or both of the rails 191, 193 by one or more mounting assemblies. However, in accordance with other embodiments of the disclosed subject matter, the transmission can be connected to the power source 218 and/or the final drive structure 216 such that the power source and/or the final drive structure supports the transmission.

Referring to FIGS. 1-4 collectively, the bed frame members 196L, 196R and the first and second cross frame members 198, 200 can form a bed frame assembly of the vehicle 10. The body 12 can include a cargo or storage area 15 that is mounted on the bed frame assembly. The first rear frame members 202L, 202R, the second rear frame members 204L, 204R, and the fourth rear frame members 208L, 208R can support the bed frame assembly.

Each of the bed frame members 196L, 196R can be connected to and can extend from a respective one of the first rear frame members 202L, 202R and a respective one of the second rear frame members 204L, 204R. Each of the bed frame members 196L, 196R can extend from the respective one of the first rear frame members 202L, 202R in the longitudinal direction L of the vehicle 10. The bed frame members 196L, 196R can be spaced apart in the transverse direction T of the vehicle.

The first and second bed cross members 198, 200 can be connected to and can extend from each of the bed frame members 196L, 196R in the transverse direction T of the vehicle 10. The first and second bed cross members 198, 200 can be spaced apart from each other in the longitudinal direction L of the vehicle 10.

As will be discussed in further detail below, the bed frame members 196L, 196R can be configured to support a load input by the roll cage 28 and transfer at least a portion of the load to the main frame assembly 30. For example, the bed frame members 196L, 196R can be connected to the first rear frame members 202L, 202R in any appropriate manner such as but not limited to welding, adhesives, mechanical fasteners, etc. Further, the first rear frame members 202L, 202R can be connected to fourth cage cross member 58 of the main frame assembly 30 in any appropriate manner such as but not limited to welding, adhesives, mechanical fasteners, etc.

Figure 5:
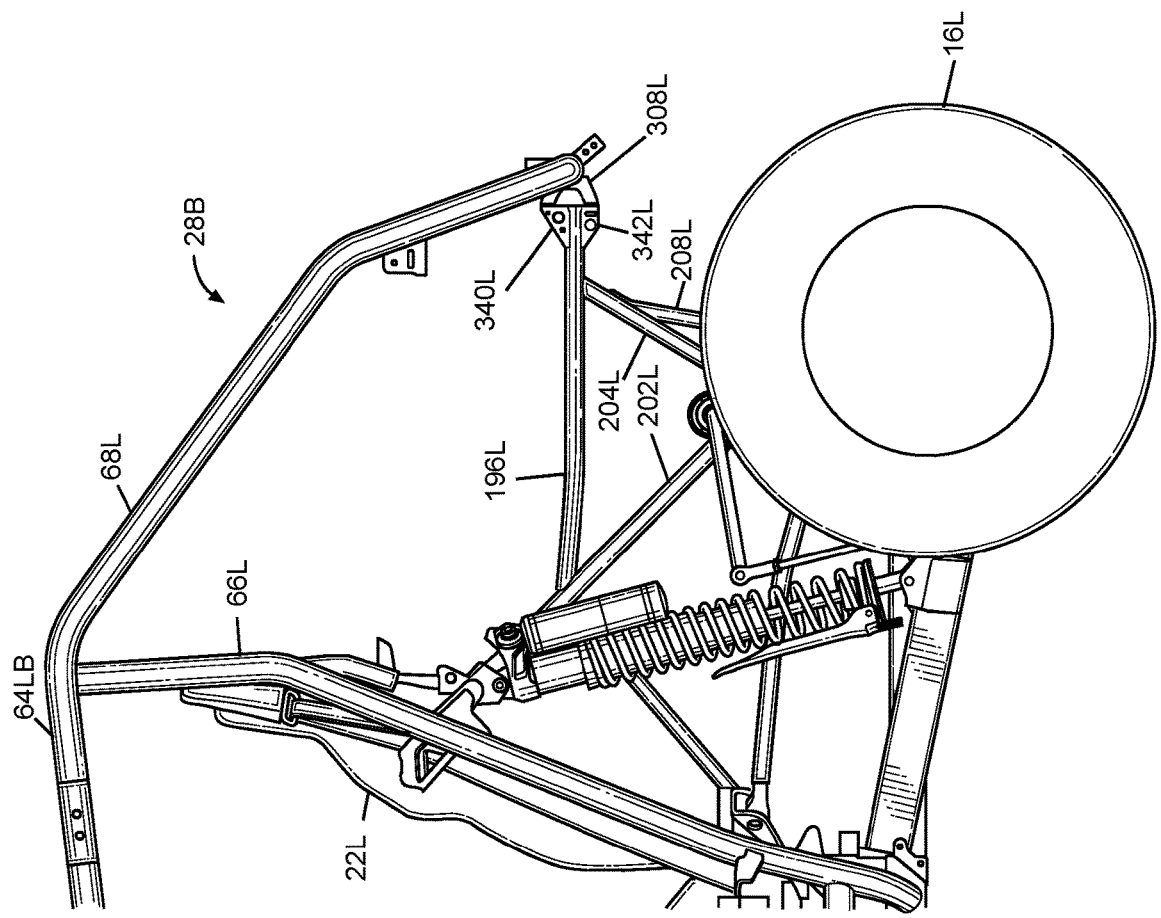
FIG. 5 is side view of a rear portion of the frame assembly of the vehicle of FIG. 1.
Figure 6:
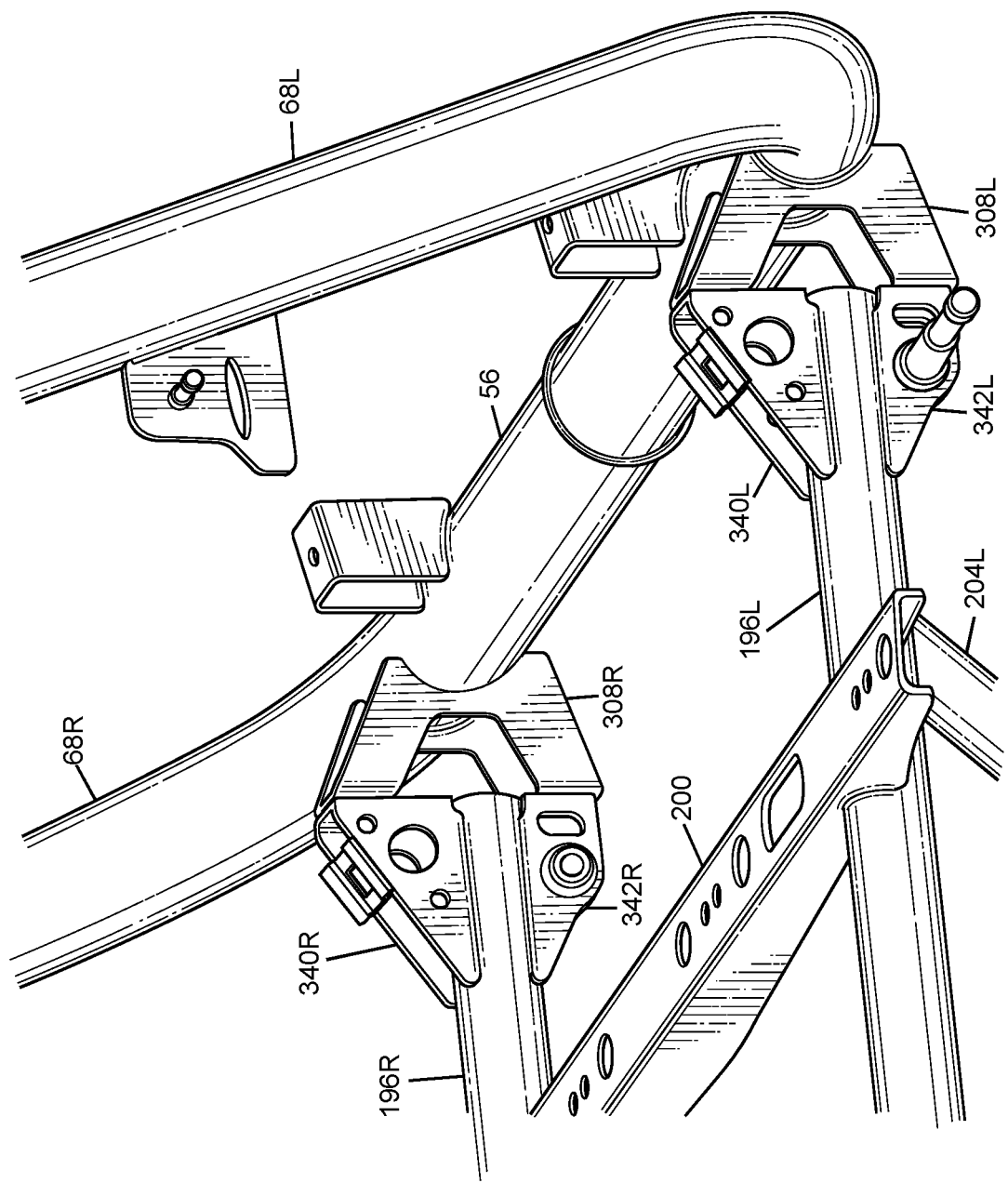
FIG. 6 is a perspective view of an enlarged portion of FIG. 5.
Figure 9:
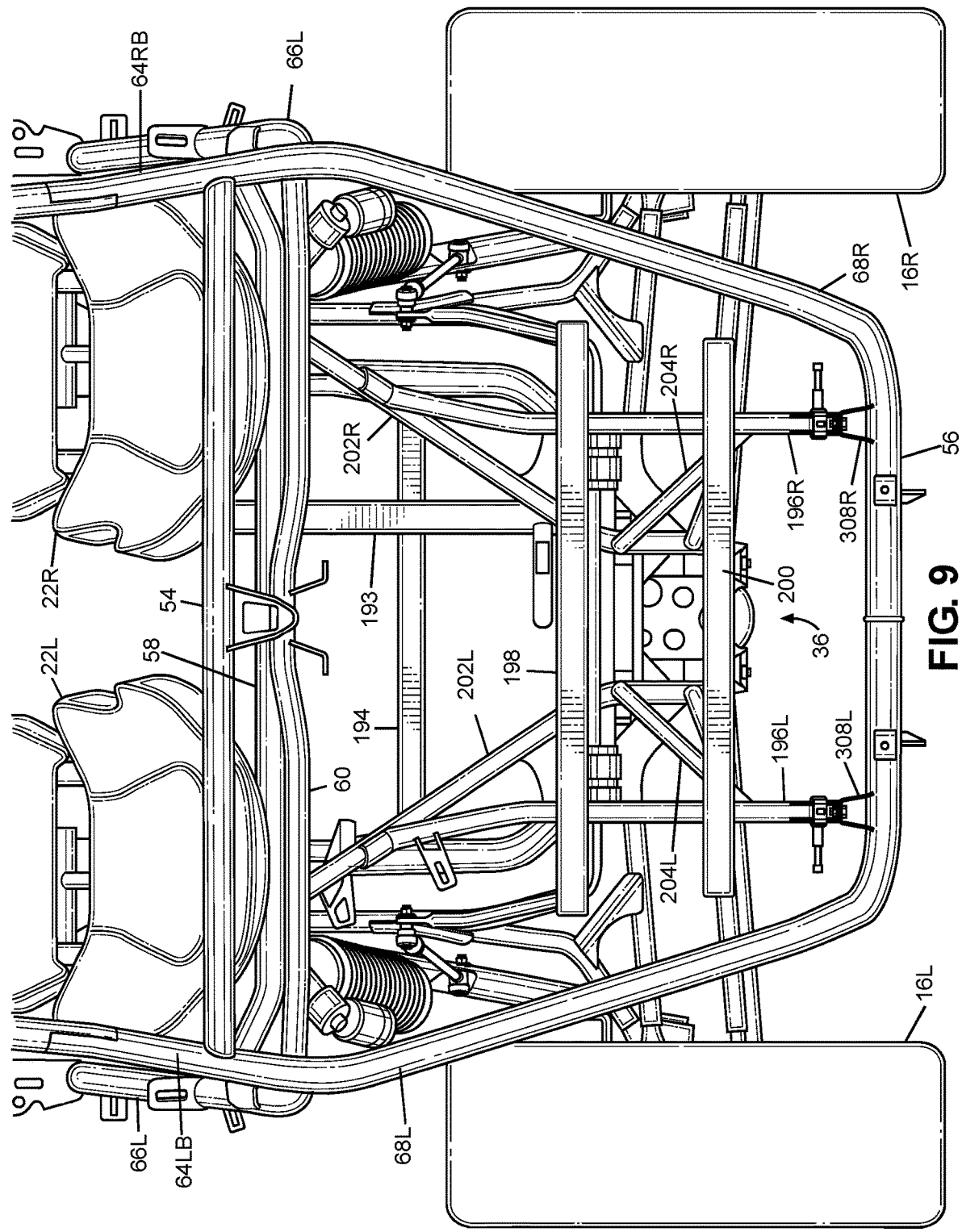
FIG. 9 is a top view of the rear portion of the frame assembly of FIG. 5.

Referring to FIGS. 4-6, the rear frame assembly 36 can further include a pair of second brackets 340L, 340R and a pair of third brackets 342L, 342R. As will be discussed in further detail below, the second brackets 340L, 340R and the third brackets 342L, 342R can connect a portion of the roll cage 28 to the rear frame assembly 36.

Each of the second brackets 340L, 340R and the third brackets 343L, 342R can be connected to and extend away from a respective one the bed frame members 196L, 196R. Each of the bed frame members 196L, 196R can extend between a respective on of the second brackets 340L, 340R and a respective one of the third brackets 342L, 3432R. That is, each of the second brackets 340L, 340R can be spaced away from the third brackets 343L, 342R. Each of the second brackets 340L, 340R can extend away from the respective one of the bed frame members 196L, 196R in a first direction, and each of the third brackets 343L, 342R can extend away from the respective one of the bed frame members 196L, 196R in a second direction that is opposite to the first direction. For example, the second brackets 340L, 340R can extend upwardly in the vertical direction V of the vehicle 10, and the third brackets 343L, 342R extend downwardly in the vertical direction V of the vehicle 10.

D. Main Frame Assembly

Referring to FIGS. 3 and 4, the main frame assembly 30 can define the passenger area and can include the roll cage 28, a pair of longitudinal members 38L, 38R and a plurality of lower cross members 40, 42, 44, a pair of upper cross members 46, 48 and a pair of support members 72L, 72R. The frame members 38L, 38R, 40, 42, 44, 46, 48, 72L, 72R can be connected together to form a fixed frame assembly in which selective removal and attachment is not intended. That is, the frame members 38L, 38R, 40, 42, 44, 46, 48, 72L, 72R are intended remain fixed to each other unless a destructive process such as but not limited to sawing, cutting, crushing, ripping, melting, etc., is applied to the fixed frame assembly. In contrast, at least one portion of the roll cage 28 is intended to be selectively removable and attachable to a remainder of the main frame assembly 30 and the rear frame assembly 36 without requiring a destructive process such as but not limited to sawing, cutting, crushing, ripping, melting, etc. Further details of removable features of the roll cage 28 will be discussed below.

The longitudinal members 38L, 38R can extend in the longitudinal direction L of the vehicle 10, from the front of the passenger area to the rear of the passenger area. The longitudinal members 38L, 38R can each be configured as a substantially straight, hollow beam having a substantially rectangular cross-sectional shape.

The first through third lower cross members 40, 42, 44 can extend in the transverse direction T of the vehicle 10, from the left longitudinal member 38L to the right longitudinal member 38R. The first lower cross member 40 can be slightly bent along the longitudinal direction L near each end toward the rear of the vehicle 10. The first lower cross member 40 can be a hollow tube having a substantially circular cross-sectional shape. The second and third lower cross members 42, 44 can be configured as a substantially straight, hollow beam having a substantially rectangular cross-sectional shape.

The first lower cross member 40 can be connected to each of the longitudinal members 38L, 38R adjacent a respective front end of the longitudinal members 38L, 38R. The second lower cross member 42 can be connected to each of the longitudinal members 38L, 38R adjacent a respective rear end of the longitudinal members 38L, 38R. The third lower cross member 44 can be connected to each of the longitudinal members 38L, 38R at a portion of the longitudinal members 38L, 38R intermediate the front and rear ends of the respective longitudinal members 38L, 38R. In the exemplary embodiment of FIGS. 3 and 4, welds can connect the lower cross members 40, 42, 44 to the longitudinal members 38L, 38R.

The first and second upper cross members 46, 48 can extend in the transverse direction T of the vehicle 10 from the left first cage side member 62L to the right first cage side assembly 62R. The first upper cross member 46 can be spaced away from the second upper cross member 48. The second upper cross member 48 can be connected to the first cage side members 62L, 62R at a position that is higher in the vertical direction V of the vehicle 10 than the position at which the first upper cross member 46 is connected to the first cage side members 62L, 62R.

The support members 72L, 72R can extend generally in the vertical direction V of the vehicle 10 from the first upper cross member 46 to the second upper cross member 48. The support members 72L, 72R can be spaced apart from each other in the transverse direction T of the vehicle 10. The support members 72L, 72R can each be configured as a hollow tube having a substantially circular cross-sectional shape. In the exemplary embodiment of FIGS. 3 and 4, welds can connect the support members 72L, 72R to the upper cross members 46, 48.

The upper cross members 46, 48 and the support members 72L, 72R can be configured to support and secure a panel assembly (such as but not limited to an instrument panel assembly), a steering assembly, and/or a portion of the body 12 (such as but not limited to a hood panel 13—see FIGS. 1 and 2).

1. Layout of Exemplary Roll Cage

The roll cage 28 generally defines the passenger compartment. The roll cage 28 can extend in the longitudinal direction L of the vehicle 10, from the front end of the passenger area to the rear end of the passenger area. The roll cage 28 can define the limits of the passenger area in the transverse direction T of the vehicle 10, the longitudinal direction L of the vehicle 10 and in the vertical direction V of the vehicle 10. The roll cage 28 can be configured to support the door assemblies 20L, 20R and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc. The roll cage 28 can be configured to resist, impede, or minimize deformation that could be caused by a load or kinetic energy input into the roll cage 28.

The roll cage 28 can be configured with any shape and contour that can be advantageous to meet the structural performance and aesthetic appeal desired for the vehicle 10. The roll cage 28 can be formed from any appropriate number of structural elements, from one to any number greater than one. For example, the roll cage 28 can include a plurality of cage cross members 52, 54, 56, 58, 60 and a plurality of cage side members 62L, 62R, 64L, 64R, 66L, 66R, 68L, 68R, 70L, 70R. Each of the cage members 52, 54, 56, 58, 60 62L, 62R, 64L, 64R, 66L, 66R, 68L, 68R, 70L, 70R can be configured as a hollow tube having a substantially circular or oval cross-section shape. The cage members 52, 54, 56, 58, 60 62L, 62R, 64L, 64R, 66L, 66R, 68L, 68R, 70L, 70R can be configured with any appropriate elongated shape that can provide the desired dimensionality of the passenger area and advantageously conform to the aesthetic appearance desired for the vehicle 10. For example, the cage members 52, 54, 56, 58, 60, 62L, 62R, 64L, 64R, 66L, 66R, 68L, 68R, 70L, 70R can be made from one or more lengths of a metal tube. Any one of the tubular cage members 52, 54, 56, 58, 60, 62L, 62R, 64L, 64R, 66L, 66R, 68L, 68R, 70L, 70R can be bent in one or more locations into a predetermined shape.

Each of the first cage side members 62L, 62R can be referred to as an A-pillar. Each of the first cage side members 62L, 62R can be connected at one end to a respective one of the longitudinal members 38L, 38R adjacent the front end of the respective one of the longitudinal members 38L, 38R. Each of the first cage side members 62L, 62R can be connected to a side of the respective one of the longitudinal members 38L, 38R that can be opposite to the side to which the first cross member 40 is connected. The one end of each of the first cage side members 62L, 62R can be aligned in the transverse direction T with a respective one of ends of the first cross member 40 that is connected to the respective one of the longitudinal members 38L, 38R. Each of the first cage side members 62L, 62R can extend along each of the vertical direction V, the transverse direction T and the longitudinal direction L of the vehicle 10.

Each of the upper cross members 46, 48 can be connected to a middle portion of each of the first cage side members 62L, 62R.

Each of the second cage side members 64L, 64R can be referred to as a roof rail or a top rail. Each of the second cage side members 64L, 64R can extend from and connect to a respective one of the first cage side members 62L, 62R. Each of the second cage side members 64L, 64R can extend from and connect to a respective one of the fourth cage side members 68L, 68R. Each of the second cage side members 64L, 64R can extend along at least the longitudinal direction L of the vehicle 10.

The first cage cross member 52 can be connected to either the first cage side members 62L, 62R or the second cage side members 64L, 64R at a location that is adjacent to the junction of the first cage side members 62L, 62R and the second cage side members 64L, 64R. Alternatively, the first cage cross member 52 can be connected at the junction of the first cage side members 62L, 62R and the second cage side members 64L, 64R.

Each of the third cage side members 66L, 66R can be referred to as a B-pillar. Each of the third cage side members 66L, 66R can be connected at a first end to a respective one of the longitudinal members 38L, 38R adjacent the rear end of the respective one of the longitudinal members 38L, 38R. Each of the third cage side members 66L, 66R can be connected to a side of the respective one of the longitudinal members 38L, 38R that can be opposite to the side to which the second lower cross member 42 is connected. The one end of each of the third cage side members 66L, 66R can be aligned in the transverse direction T with the ends of the second cross member 42 that are connected to the longitudinal members 38L, 38R.

Each of the third cage side members 66L, 66R can be connected at a second end to either a respective one of the second cage side members 64L, 64R or a respective one of the fourth cage side members 68L, 68R at a location that is adjacent to a junction of the respective one of the second cage side members 64L, 64R and the respective one of the fourth cage side members 68L, 68R. Alternatively, each of the third cage side members 66L, 66R can be connected at the second end to the junction of the respective one of the second cage side members 64L, 64R and the respective one of the fourth cage side members 68L, 68R.

The second cage cross member 54 can be connected to either the second cage side members 64L, 64R, or the third cage side members 66L, 66R, or the fourth cage side members 68L, 68R at a location that is adjacent to the junction of the second cage side members 64L, 64R, the fourth cage side members 68L, 68R. Alternatively, the second cage side members 64L, 64R, the third cage side members 66L, 66R and the fourth cage side members 68L, 68R.

Each of the fourth cage side members 68L, 68R can be connected to and extend away from a respective one of the second cage side members 64L, 64R along the longitudinal direction L of the vehicle 10.

The first through fifth cage cross members 52, 54, 56, 58, 60 can extend in the transverse direction T of the vehicle 10 from the left side of the roll cage 28 to the right side of the roll cage 28. The cage cross members 52, 54, 56, 58, 60 can be connected to each of to the respective pair(s) of the case side members at respective locations spaced apart along the longitudinal direction L of the vehicle 10. The cage cross members 52, 54, 56, 58, 60 can be configured to maintain a predetermined spacing between the left cage side members 62L, 64L, 66L, 68L and the right cage side members 62R, 64R, 66R, 68R in the transverse direction T. The cage cross members 52, 54, 56, 58, 60 can define the limits of the passenger area in the longitudinal direction L of the vehicle 10 and the vertical direction V of the vehicle 10. The cage cross members 52, 54, 56, 58, 60 can be configured to manage load and/or energy inputs so that deflection of the frame assembly 18 in the vicinity of the passenger area can be controlled in an advantageous predetermined manner. In the exemplary embodiment of FIG. 3, the cage cross members 52, 54, 56, 58, 60 can be connected to a respective left-side and right-side pair of the cage side members 62L, 62R, 64L, 64R, 66L, 66R, 68L, 68R by welding.

2. Modular Construction of Exemplary Roll Cage

Referring to FIGS. 2-4 collectively, the roll cage 28 can have a modular construction that includes a first cage module 28A, a second cage module 28B, and a third cage module 28C.

The third cage module 28C can be connected to the longitudinal members 38L, 38R to form a portion of the fixed frame assembly of the main frame assembly 30. That is the frame members 38L, 38R, 40, 42, 44, 46, 48, 72L, 72R and the third cage module 28C are intended remain fixed to each other unless a destructive process such as but not limited to sawing, cutting, crushing, ripping, melting, etc., is applied to the fixed frame assembly.

In contrast, each of the first cage module 28A and the second cage module 28B can be selectively removable and attachable to third cage module 28C at one or more predetermined locations without requiring a destructive process such as but not limited to sawing, cutting, crushing, ripping, melting, etc., in order to remove either of the first cage module or the second cage module 28B from the third cage module 28C. FIG. 3 shows the first cage portion 28A and second cage module 28B removed from the third cage module 28C. Referring to FIG. 4, the second cage module 28B can be removably connected to the first cage module 28A without requiring a destructive process such as but not limited to sawing, cutting, crushing, ripping, melting, etc., in order to remove the second cage module 28B from the first cage module, or vice versa. For example, mechanical connectors such as but not limited to threaded fasteners, latches, clamps, etc., can connect the first cage module 28A and the second cage module 28C to each other and to the third cage module 28C. Thus, the first cage module 28A and the second cage module 28B, alone or in combination, can be referred to as a removable frame assembly.

Referring to FIGS. 2-4, each of the first cage side members 62L, 62R, the second cage side members 64L, 64R and the third cage side members 66L, 66R can be divided into respective first sections 62LA, 62RA, 64LA, 64RA, 66LA, 66RA and second sections 62LB, 62RB, 64LB, 64RB, 66LB, 66RB. The first cage module 28A can include the second sections 62LB, 62RB of the first cage side members 62L 62R, the first sections 64LA, 64RA of the second cage side members 64L 64R, and the first cage cross member 52. The second cage module 28B can include the second sections 64LB, 64RB of the second cage side members 64L, 64R, the fourth cage side members 68L, 68R, the second cage cross member 54 and the third cage cross member 56. The third cage module 28C can include the first sections 62LA, 62RA of first cage side members 62L, 62R and the first sections 66LA, 66RA of the third cage side members 66L, 66R.

Referring to FIG. 4, each of first sections 62LA, 62RA of the first cage side members 62L, 62R can be fixed to the respective one of the longitudinal members 38L, 38R to be part of the fixed frame assembly of the main frame assembly 30 discussed above. Further, each of the first sections 66LA, 66RA of the third cage side members 66L, 66R can be fixed to the respective one of the longitudinal members 38L, 38R to be part of the fixed frame assembly of the main frame assembly 30 discussed above. Thus, FIG. 4 illustrates an exemplary fixed frame assembly that includes the fixed frame assembly of the main frame assembly 30 and the fixed frame assembly of the rear frame assembly 36.

Referring to FIG. 3, a pair of first joint assemblies 300L, 300R can removably connect the first cage module 28A to the third cage module 28C. Each of the first joint assemblies 300L, 300R can include a pair of overlapping members, and a pair of threaded fasteners that pass through each of the overlapping members and secure the overlapping members together. FIG. 4 shows exemplary overlapping members 306L, 306R connected to the end of a respective one of the first sections 62LA, 62RA of the first cage side members 62L, 62R. Referring to FIGS. 3 and 4, each of the second sections 62LB, 62RB of the first cage side members 62L, 62R can include mating overlapping portions. Thus, the first joint assemblies 300L, 300R can be referred to as lap joints.

Referring to FIG. 3, a pair of second joint assemblies 302L, 302R can removably connect the second cage module 28B to the third cage module 28C. Referring to FIGS. 2-4, the second joint assemblies 302L, 302R can include the same structure as described above with respect to the first joint assemblies 300L 300R.

Referring to FIG. 3, a pair of joint assemblies 304L, 304R can connect the first cage module 28A to the second cage module 28B. Referring to FIGS. 2-4, the third joint assemblies 304L, 306R can include the same structure as described above with respect to the first joint assemblies 300L 300R.

In summary, the roll cage 28 includes three cage modules 28A, 28B, 28C, and at least a portion of each of the front frame assembly 32, the main frame assembly 30 and the rear frame assembly 36 includes a fixed frame assembly. Thus, the frame assembly 18 can be referred to as a modular frame assembly that includes a fixed frame assembly, such as but not limited to the rear frame assembly 36, and a removable frame assembly, such as but not limited to the second cage module 28B.

3. Load and Kinetic Energy Management

Referring to FIGS. 1-3, the third cage cross member 56 can be located outside of the passenger compartment. Thus, deformation of the third cage cross member 56 caused by a load or kinetic energy input to the third cage cross member 56 can take place outside of the passenger compartment. That is, the third cage cross member 56 can be configured to deform in a predictable and predetermined controlled manner when a load or kinetic energy is input into the third cage cross member 56, 68L, 68R that exceeds a first predetermined threshold without intruding into the passenger compartment. Further, the third cage cross member 56 can be located at a rearmost extent of the vehicle. Thus, the third rear cage cross member 56 also can be a rear bumper member for the vehicle 10 that can absorb a predetermined load or kinetic energy without transferring the load or kinetic energy to the rear frame assembly 36, or can at least reduce the load or kinetic energy that is transferred to the rear frame assembly 36.

Further, the third cage cross member 56 can be connected to the fixed frame assembly provided by the rear frame assembly 36 and/or the main frame assembly 30 with at least one member that is configured to deform in a predictable and predetermined controlled manner when a load or kinetic energy is input into the 58, 68L, 68R that exceeds a second predetermined threshold. The second predetermined threshold can be the same as or different from the first predetermined threshold of the third cage cross member 56. Thus, the frame assembly 18 can absorb all of or at least a portion of a load or kinetic energy input to the third cage cross member 56; thereby reducing an amount of the load or kinetic energy input at the rear end of the vehicle 10 that is transmitted into the main frame assembly 30.

The at least one deformable member can be configured as a bracket that connects the third cage cross member 56 to at to a relatively rigid portion of the rear frame assembly 36 such that the bracket and/or the third cage cross member 56 is/are subject to deformation before the rear frame assembly 36 is subject to deformation if a load or kinetic energy is input to the third cage cross member 56. The bracket can be configured to deform in a predictable and predetermined controlled manner if a load or kinetic energy input to the third cage cross member 56 is greater than a predetermined threshold that is the same as or different from the predetermined threshold for deformation of the third rear cage cross member 56.

Referring to FIGS. 5-11, the roll cage 28 can include a pair of first brackets 308L, 308R connected to and extending away from the third cage cross member 56 and connected to and extending away from a respective one of the bed frame members 196L, 196R. Each of the first brackets 308L, 308R can be configured to deform in a predictable and predetermined controlled manner if a load or kinetic energy input to the third cage cross member 56 is greater than a predetermined threshold that is the same as or different from the predetermined threshold for deformation of the third rear cage cross member 56.

The first brackets 308L, 308R can be spaced apart from each other in the transverse direction T of the vehicle. The first brackets 308L, 308R can be directly or indirectly connected to the third cage cross member 56. For example, the first brackets 308L, 308R can be connected to the third cage cross member 56 in any appropriate manner such as but not limited to welding, adhesives, mechanical fasteners, etc.

The first brackets 308L, 308R can be stamped of sheet metal and bent into any appropriate shape. Alternatively, the first brackets 308L, 308R can be made from a plurality of metal parts that are subsequently connected together. Further, the first brackets 308L, 308R can be made from a material other than metal, or a composite of more than one material that might or might not include a metal.

The left-side first bracket 308L can be identical to, a mirror image of, or completely different from the right-side first bracket 308R. In the exemplary embodiment of FIGS. 5-11, the first brackets 308L, 308R can be identical to each other. Accordingly, the following description is directed toward the right-side first bracket 308R.

Referring to FIGS. 7 and 8, the right-side first bracket 308R can include at least one base 310 and at least one arm 312. The first arm 312 can include a first end 314 and a second end 316. The first end 314 of the first arm 312 can be connected to the base 310. The second end 316 of the first arm 312 can be connected to the third cross cage member 56. The first arm 312 can be connected to the first base 310 and the third cage cross member 56 in any appropriate manner such as but not limited to welding, adhesives, molding, stamping, bending, machining, mechanical fasteners, etc. In the exemplary embodiment of FIGS. 5-11, the first arm 312 can be integrally formed with the first base 310 by stamping a bending a metal sheet. Further, the second end 316 of the first arm 312 can be welded to the third cage cross member 56.

The first arm 312 can extend along each of the longitudinal direction L of the vehicle 10 and a vertical direction V of the vehicle 10. Thus, the first base 310 can be located at a position along the vertical direction V of the vehicle 10 that is spaced above the third cage cross member 56. (See also, FIGS. 5 and 6). As will be discussed in further detail below, the first arm 312 can be configured to deform in a predictable and predetermined controlled manner if a load or kinetic energy input by the third cage cross member 56 exceeds a predetermined threshold.

Referring to FIGS. 5 and 6, the first base 310 can be selectively and removably connected to the second bracket 340R in any appropriate manner that facilitates attachment and removal of the first base 310 with a destructive process such as but not limited to sawing, cutting, crushing, ripping, melting, etc. For example, a threaded fastener assembly 344 can selectively and removably connect the first base 310 to the second bracket 340R. The threaded fastener assembly 344 can include a threaded bolt that passes through a hole in each of the first base 310 and the second bracket 340R. The heads of the thread bolt can abut the first base 310. A nut can be tightened onto the threaded bolt and against the second bracket 340R. Thus, the bracket 308R can be selectively and removably connected to the second bracket 340R.

The right-side first bracket 308R can further include a second arm 318. The second arm 314 can include a first end 320 and a second end 322. The first end 320 of the second arm 318 can be connected to the base 310. The second end 322 of the second arm 322 can be connected to the third cross cage member 56. The second arm 318 can be connected to the base 310 and the third cage cross member 56 in any appropriate manner such as but not limited to welding, adhesives, molding, stamping, bending, machining, mechanical fasteners, etc. In the exemplary embodiment of FIGS. 5-11, the second arm 318 can be integrally formed with the base 310 by stamping a bending a metal sheet. Further, the second end 322 of the second arm 318 can be welded to the third cage cross member 56.

The second arm 318 can extend along each of the longitudinal direction L of the vehicle 10 and a vertical direction V of the vehicle 10. Thus, the base 310 can be located at a position along the vertical direction V of the vehicle 10 that is spaced above the third cage cross member 56. (See also, FIGS. 5 and 6). As will be discussed in further detail below, the second arm 318 can be configured to deform in a predictable and predetermined controlled manner if a load or kinetic energy input by the third cage cross member 56 exceeds a predetermined threshold.

Figure 10:
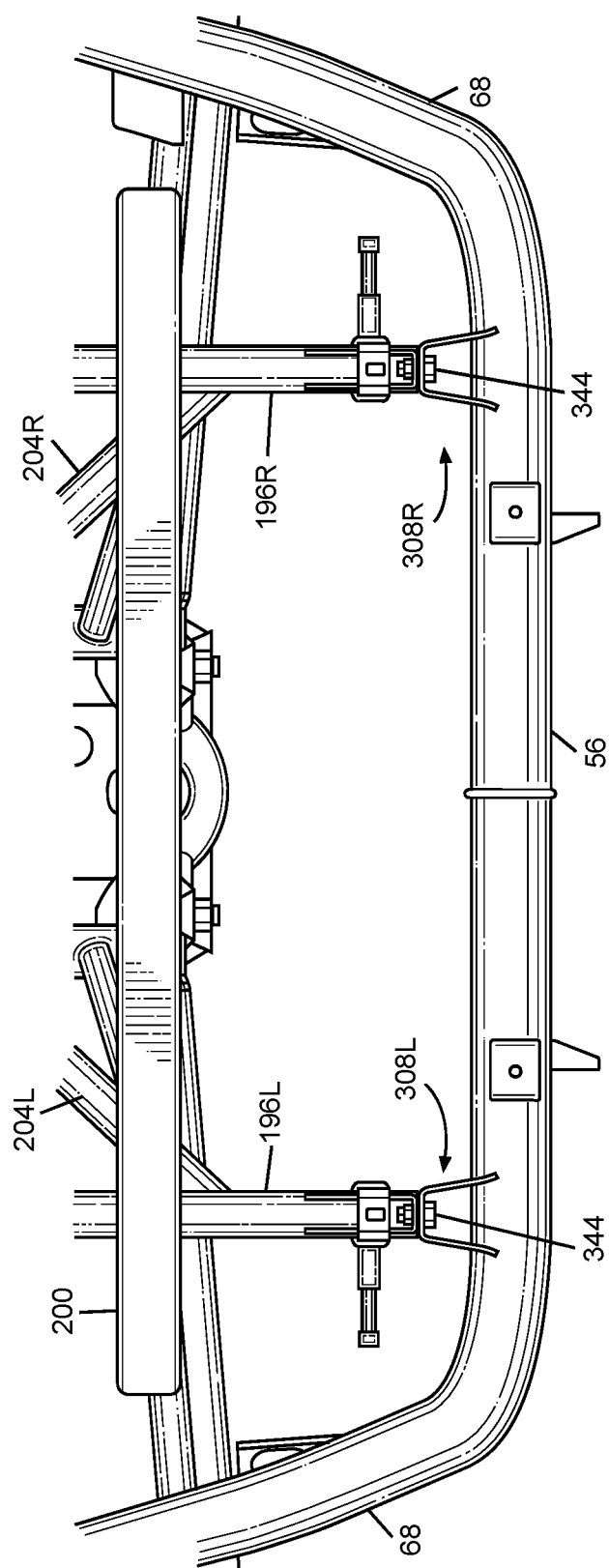
FIG. 10 is a top view of an enlarged portion of FIG. 9.
Figure 11:
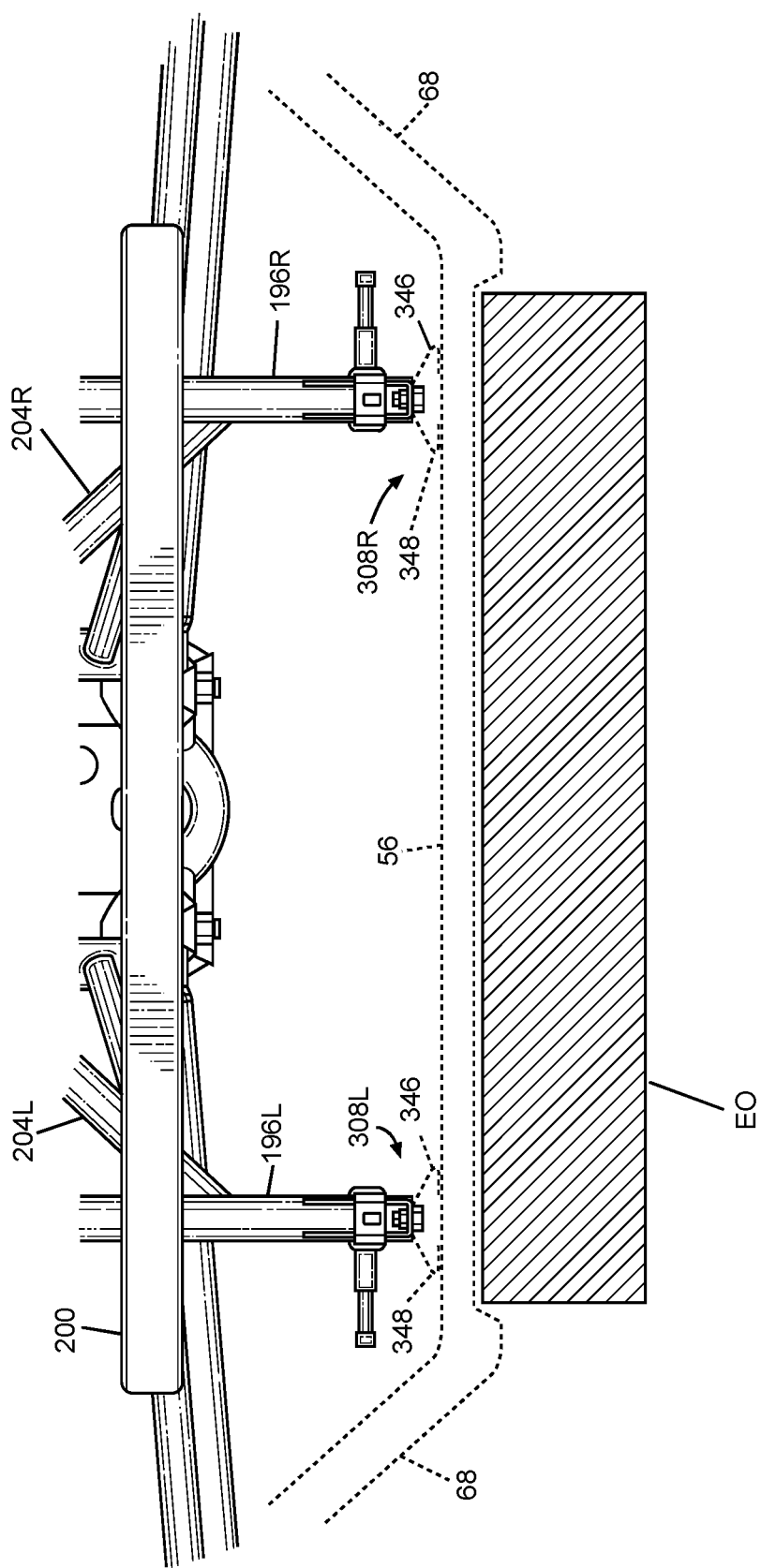
FIG. 11 is a top view of the enlarged portion of FIG. 9, and shows an exemplary deformation of a portion of a cage cross member and a pair of brackets.

Referring to FIGS. 10 and 11, each of the third cage cross member 56 and the first brackets 308L, 308R can be configured to deform in a predictable and predetermined controlled manner if an external object EO inputs a load or kinetic energy into the third cage cross member 56 that exceeds a first predetermined threshold. For example, the third cage cross member 56 can be configured to deform inwardly along the longitudinal direction L of the vehicle 10. Further, each of the first and second arms 312, 318 can deform to form a bent part 346, 348 if a load or kinetic energy input to the bracket 308L, 308R exceeds a second predetermined threshold. The second predetermined threshold can be the same as or different from the first predetermined threshold set for the third cage cross member 56. The first and second arms 312 318 can be configured to deform into the bent parts 346, 348 such that the second ends 316 322 move toward the first ends 314, 320 and the bent parts 346, 348 form on the first and second arms 312, 318 at a location that is spaced away from the first ends 314, 320 and the second ends 316, 322.

Thus, the third cage cross member 56 and the brackets 308L, 308R can absorb the load or kinetic energy input to the third cage cross member 56, or at least reduce a load or kinetic energy that is transferred to the rear frame assembly 36. Further, as shown in FIG. 11, the predictable and predetermined controlled deformation of the third cage cross member 56 and the first brackets 308L, 308R is spaced away form the passenger compartment.

Referring to FIG. 7, the first bracket 308R can further include a second base 324, a third arm 326 and a fourth arm 328. Each of the third and fourth arms 326, 328 can include a first end and a second end. The first ends 330, 332 of the third and fourth arms 326, 328 can be connected to the base 310. The second ends 334 of the third and fourth arms 326, 328 can be connected to the third cross cage member 56. (The second end of the fourth arm 328 is obstructed from view in FIG. 7). The third and fourth arms 326, 328 can be connected to the second base 324 and the third cage cross member 56 in any appropriate manner such as but not limited to welding, adhesives, molding, stamping, bending, machining, mechanical fasteners, etc. In the exemplary embodiment of FIGS. 5-11, the third and fourth arms 326, 328 can be integrally formed with the second base 324 by stamping a bending a metal sheet. Further, each of the second ends 334 of the third and fourth arms 326, 328 can be welded to the third cage cross member 56.

The third and fourth arms 326, 328 can extend along each of the longitudinal direction L of the vehicle 10 and a vertical direction V of the vehicle 10. Thus, the first base 310 can be located at a position along the vertical direction V of the vehicle 10 that is spaced below the third cage cross member 56. (See also, FIGS. 5 and 6). As will be discussed in further detail below, the third and fourth arms 326, 328 can be configured to deform in a predictable and predetermined controlled manner if a load or kinetic energy input by the third cage cross member 56 exceeds a predetermined threshold.

Referring to FIGS. 7 and 8, the second arm 318 can be spaced apart from the first arm 312 in the transverse direction T of the vehicle. For example, the first ends 314, 320 of the first and second arms 312, 318 can be spaced apart by in the transverse direction T by a first distance D1. Further, the second ends 316, 322 of the first and second arms 312, 318 can be spaced apart by in the transverse direction T by a second distance D2 that is greater than the first distance D1.

The third and fourth arms 326, 328 can be arranged in the same manner as the first and second arms 312, 318.

Referring to FIGS. 5-7, the first and second arms 312, 318 extend away from the third cage cross member 56 in a direction along the vertical direction V of the vehicle 10 that is opposite to the direction in which the third and fourth arms 326, 328 extend away from the third cage cross member 56. That is, the second base 324 is spaced away from the first base 310 in the vertical direction V of the vehicle 10. Referring to FIG. 7, the first and second bases 310, 324 are spaced apart in the vertical direction V of the vehicle 10 by a first distance D3. Further the second ends 316, 322 of the first and second arms 312, 318 are space apart in the vertical direction V of the vehicle 10 from the second ends 334 of the third and fourth arms 326, 328 by a second distance D4 that is less than the first distance D3.

A threaded fastener assembly (such as threaded fastener assembly 344) can selectively and removably connect the second base 324 to the third bracket 342R. Each of the second base 324 and the third bracket 342R can include a hole through which the threaded fastener assembly passes.

The first bracket 308R can further include a first bridge member 336 and a second bridge member 338. The first bridge member 336 can be connected to and extend from each of the first arm 312 and the third arm 326. The second bridge member 338 can be connected to and extend from each of the second arm 318 and the fourth arm 328. Each of the first and second bridge members 336, 338 can be connected to and abut the third cage cross member 56.

The third and fourth arms 326, 328 can be configured to form a respective bent part in the manner described above with respect to the first and second arms 312, 318. Thus, the third and fourth arms 326, 328 can decrease the load or kinetic energy that can be transferred to the rear frame assembly 36.

VI. Alternative Embodiments

While certain embodiments of the invention are described above, and FIGS. 1-11 disclose a best mode for practicing the various inventive aspects, it should be understood that the invention can be embodied and configured in many different ways without departing from the spirit and scope of the invention.

For example, embodiments are disclosed above in the context of a vehicle 10 shown in FIG. 1. However, embodiments are intended to include or otherwise cover any type of vehicle disclosed above. For example, exemplary embodiments are intended to include or otherwise cover any type of vehicle that can travel on an improved surface such as but not limited to a paved road.

Exemplary embodiments are intended to include or otherwise cover any type of rear frame assembly 36. In other words, exemplary embodiments are intended to cover any application of frame assembly that can sustain load or kinetic energy inputs to a tubular frame member. For example, the number of first brackets 308L, 308R can be increased or decreased in order to achieve the desired load or energy attenuation. Further, the first brackets 308L, 30* can be connected to a different part of the rear frame assembly 36 based on packaging, ease of assembly, ease or repair and/or replacement targets etc.

Exemplary embodiments are intended to include or otherwise cover a tubular frame member connected to the brackets 308L, 308R that is not a component of the roll cage 28.

Exemplary embodiments are intended to include any appropriate shape for each of the front or rear frame members, including different cross-sectional shapes, hollow or solid shapes, etc.

Exemplary embodiments are intended to include or otherwise cover any appropriate shape of the roll cage 28.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A frame assembly for a vehicle comprising:
    a fixed frame assembly including a rear frame member extending along a longitudinal direction of the vehicle and ending at a rear end of the fixed frame assembly;
    a removable frame assembly configured to be selectively removed and attached to the fixed frame assembly, the removable frame assembly includes a tubular frame member extending along the rear end of the fixed frame assembly, and the tubular frame member is configured to deform in a predetermined controlled manner if a load or kinetic energy input to the tubular frame member is greater than a first predetermined threshold; and
    a bracket connected to each of the tubular member and the rear frame member, and the bracket is configured to deform in a predetermined controlled manner if a load or kinetic energy input to the bracket is greater than a second predetermined threshold,
    the bracket including a base connected to the rear frame member and at least one arm connected to and extending away from the base, the at least one arm connected to the tubular frame member, the arm extending from the tubular frame member to the rear frame member along a vertical direction of the vehicle such that the base is located at a position along the vertical direction of the vehicle that is spaced above the tubular frame member.

2. The frame assembly according to claim 1, wherein the arm extends along each of the longitudinal direction of the vehicle and the vertical direction of the vehicle.

3. The frame assembly according to claim 2, wherein the bracket further includes a second base and an arm extending from the tubular frame member to the second base along a vertical direction of the vehicle such that the second base is located at a position along the vertical direction of the vehicle that is spaced below the tubular frame member.

4. The frame assembly according to claim 1, wherein the fixed frame assembly further includes a second bracket connected to and extending away from the rear frame member, and the second bracket is connected to the bracket.

5. The frame assembly according to claim 1, wherein the fixed frame assembly further includes a second bracket connected to and extending away from the rear frame member, and
    the frame assembly further comprises a threaded fastener assembly that passes through each of the bracket and the second bracket and selectively and removably connects the bracket to the second bracket.

6. The frames assembly according to claim 1, wherein the at least one arm of the bracket includes a pair of arms, and the arms of the pair are spaced apart from each other in a transverse direction of the vehicle.

7. The frame assembly according to claim 1, wherein the at least one arm of the bracket includes a pair of arms, first ends of the arms of the pair are spaced apart in a transverse direction of the vehicle by a first distance, and second ends of the arms are spaced apart in the transverse direction of the vehicle by a second distance that is greater than the first distance.

8. The rear frame assembly according to claim 1, wherein the tubular frame member has a circular cross-sectional shape and extends along a transverse direction of the vehicle.

9. A modular frame assembly for a vehicle comprising:
    a fixed frame assembly including a plurality of frame members fixed in a predetermined spatial relationship to each other, the plurality of frame members including at least a pair of rear frame members fixed relative to each other and extending along a longitudinal direction of the vehicle;
    a removable frame assembly configured to be selectively removable and attachable to the fixed frame assembly at a plurality of predetermined locations on the fixed frame assembly, the removable frame assembly includes a tubular member configured to deform in a predetermined controlled manner if a load or kinetic energy input to the tubular member is greater than a first predetermined threshold; and
    a pair of brackets, each of the brackets is connected to the tubular member and a respective one of the rear frame members, and each of the brackets is configured to deform in a predetermined controlled manner if a load or kinetic energy input to the respective one of the brackets is greater than a second predetermined threshold,
    each of the brackets including first and second bases spaced apart from each other and first and second sets of arms, each arm of the first set having a first end connected to the first base and an opposite second end connected to the tubular member, each arm of the second set having a first end connected to the second base and an opposite second end connected to the tubular member, the sets of arms configured such that the first and second bases are substantially equidistant from the tubular member.

10. The modular frame assembly according to claim 9, wherein
    the first set of arms includes a pair of first arms connected to and extending from each of the first base and the tubular frame member, and
    the second set of arms includes a pair of second arms connected to and extending from each of the second base and the tubular frame member.

11. The modular frame assembly according to claim 10, wherein
    the first base is spaced away from the second base by a first distance along a vertical direction of the vehicle, and
    each of the second ends of the first arms is spaced away from a respective one of the second ends of the second arms by a second distance along a vertical direction of the vehicle, and the second distance is less than the first distance.

12. The modular frame assembly according to claim 10, wherein each of the brackets further includes,
    a first bridge member connecting to and extending from each of a first one of the first arms and a first one of the second arms, and
    a second bridge member connecting to and extending from each of a second one of the first arms and a second one of the second arms.

13. The modular frame assembly according to claim 12, wherein each of the first and second bridge members is connected to and abuts the tubular frame member.

14. The modular frame assembly according to claim 9, wherein the fixed frame assembly further includes,
a pair of second brackets, each of the second brackets is connected to and extends away from a respective one of the rear frame members, and each of the second brackets is connected to a respective one of the first bases, and
a pair of third brackets, each of the third brackets is connected to and extends away from a respective one of the rear frame members, and each of the third brackets is connected to a respective one of the second bases.

15. The modular frame assembly according to claim 14, wherein each of the second brackets is spaced away from a respective one of the third brackets.

16. The modular frame assembly according to claim 14, wherein each of the second brackets extends away from the respective one of the rear frame members in a first direction, and each of the third brackets extends away from the respective one of the rear frame members in a second direction that is opposite to the first direction.

17. An all-terrain vehicle comprising:
a fixed frame assembly including,
a main frame assembly including a plurality of main frame members connected together to define a first portion of a passenger compartment, each of a pair of the main frame members includes a main frame joint member,
a front frame assembly configured to support a front suspension and wheel assembly and connected to a front end of the main frame assembly, and
a rear frame assembly configured to support a front suspension and wheel assembly and connected to a rear end of the main frame assembly such that the main frame assembly is located between the front frame assembly and the rear frame assembly, and the rear frame assembly includes,
a pair of rear frame members extending away from the main frame assembly along a longitudinal direction of the vehicle and spaced apart in a transverse direction of the vehicle, and
a pair of first brackets, each of the first brackets is connected to and extends from a respective one of the rear frame members; and
a removable frame assembly configured to define a second portion of the passenger compartment, and including,
a pair of first removable frame members extending along the longitudinal direction of the vehicle and spaced apart from each other in the transverse direction of the vehicle,
a pair of second removable frame members, each of the second removable frame members is connected to a respective one of the first removable frame members, and each of the second removable frame members includes a removable frame joint member selectively and removably connected to a respective one of the main frame joint members,
a tubular frame member connected to and extending from each of the first removable frame members along the transverse direction of the vehicle, and the tubular frame member configured to deform in a predetermined controlled manner if a load or kinetic energy input to the tubular frame member is greater than a first predetermined threshold, and
a pair of second brackets connected to and extending away from the tubular member along the longitudinal direction of the vehicle, each of the second brackets is selectively and removably connected to a respective one of the first brackets, and each of the second brackets is configured to deform in a predetermined controlled manner if a load or kinetic energy input to a respective one of the brackets is greater than a second predetermined threshold.

18. The all-terrain vehicle according to claim 17, wherein each of the second brackets includes,
a base connect to the respective one of the first brackets, and
a pair of arms spaced apart in the transverse direction of the vehicle, each of the arms includes a first end connected to the base and a second end connected to the tubular member, the first ends of the arms are spaced apart in the transverse direction by a first distance, each of the arms deform in a predetermined manner to form a bent part that is spaced away from each of the first and second ends if a load or kinetic energy input to the tubular member is greater than the second predetermined threshold, and the bent parts are spaced apart by a second distance in the transverse direction that is greater than the first distance.

* * * * *